United States Patent [19]
Acerbi

[11] 3,951,235
[45] Apr. 20, 1976

[54] GREASING DEVICE FOR CABLES

[76] Inventor: Virgilio Acerbi, Via Francesco Crispi 39, La Spezia, Italy

[22] Filed: Mar. 26, 1974

[21] Appl. No.: 454,881

[30] Foreign Application Priority Data
Nov. 12, 1973 Italy.................................. 70303/73

[52] U.S. Cl................................. 184/15 R; 184/46
[51] Int. Cl.² ........................................ F16N 11/06
[58] Field of Search............... 184/16, 15 R, 24, 25, 184/14, 46; 118/420, 234, 78, 404, 405

[56] References Cited
UNITED STATES PATENTS

| | | | |
|---|---|---|---|
| 296,440 | 4/1884 | Oliver................... | 184/15 R |
| 1,115,623 | 11/1914 | Vincent.................. | 184/46 |
| 1,439,853 | 12/1922 | Vincent.................. | 184/46 |
| 1,465,495 | 8/1923 | Stone..................... | 184/25 |
| 1,530,812 | 3/1925 | Clegg..................... | 184/25 X |
| 2,847,880 | 9/1958 | Neidig.................... | 184/15 R X |
| 3,084,662 | 4/1963 | Badger................... | 118/404 X |
| 3,233,585 | 2/1966 | Majette................... | 118/405 X |

Primary Examiner—Richard C. Pinkham
Assistant Examiner—William R. Browne
Attorney, Agent, or Firm—Ladas, Parry, Von Gehr, Goldsmith & Deschamps

[57] ABSTRACT

A greasing device for cables comprising at least one hollow body having walls defining an inner chamber adapted to be filled with a predetermined quantity of a lubricating material having a relatively high coefficient of viscosity, and a predetermined pressure. At least one couple of apertures are provided through said walls for a cable to be greased to extend therethrough and across said inner chamber so as to come into contact with said lubricating material inside said chamber; the size of said apertures being such that a predetermined clearance is present between the periphery of each aperture and the surface of the cable when the latter is mounted through the greasing device. A weighted member travels through the chamber housing, while acting on the grease therein, to force the grease toward the cable passing through the housing and toward the apertures in the housing through which the cable passes.

20 Claims, 9 Drawing Figures

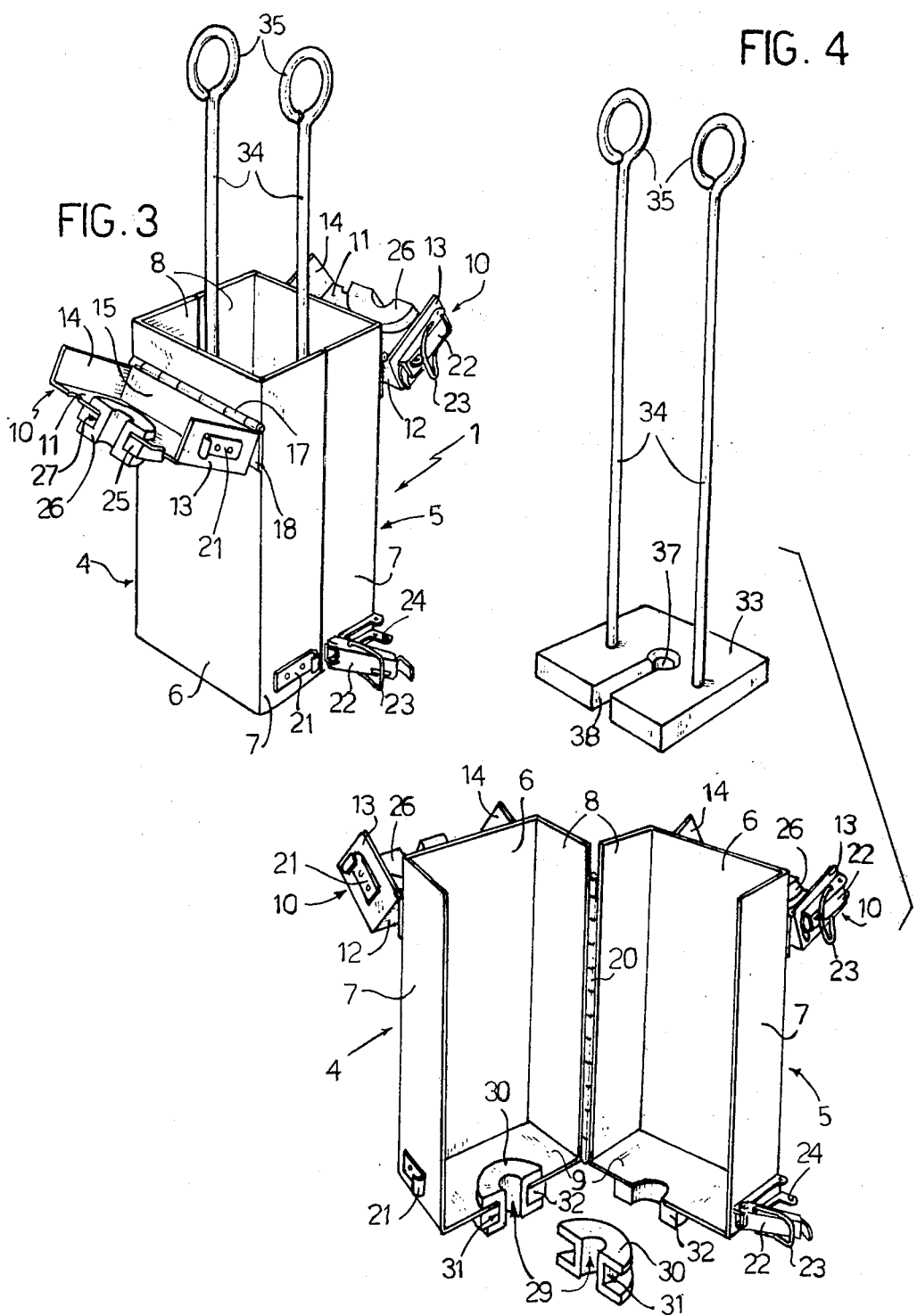

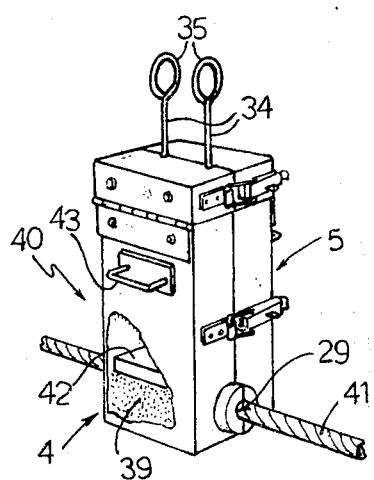
FIG. 5
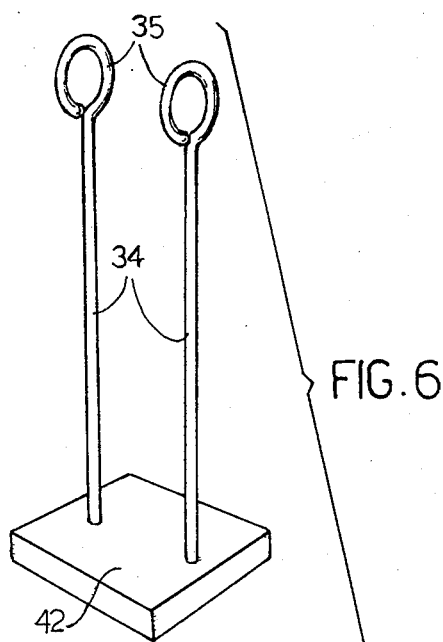
FIG. 6
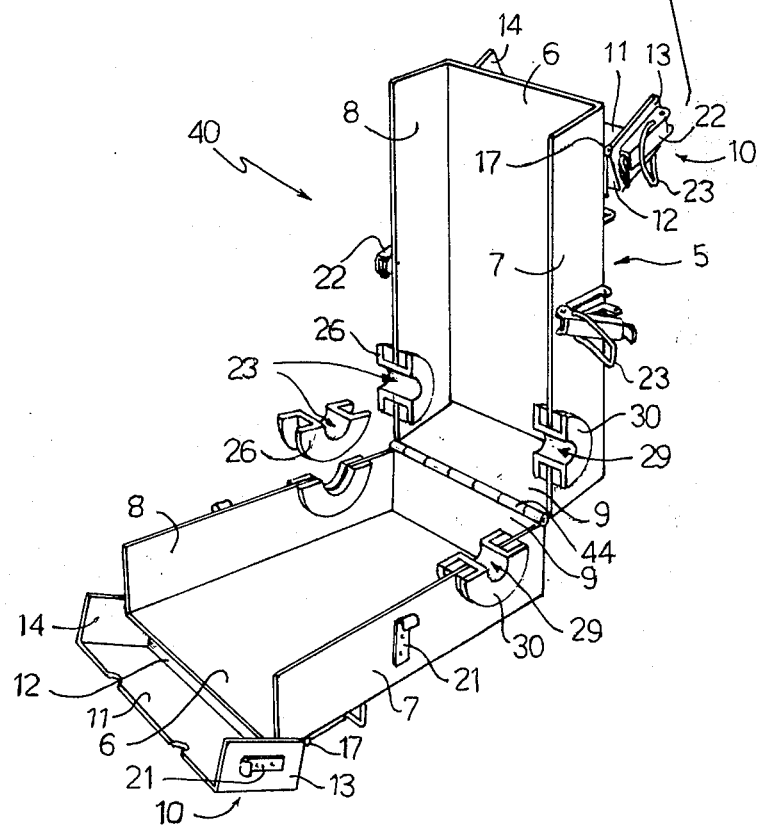

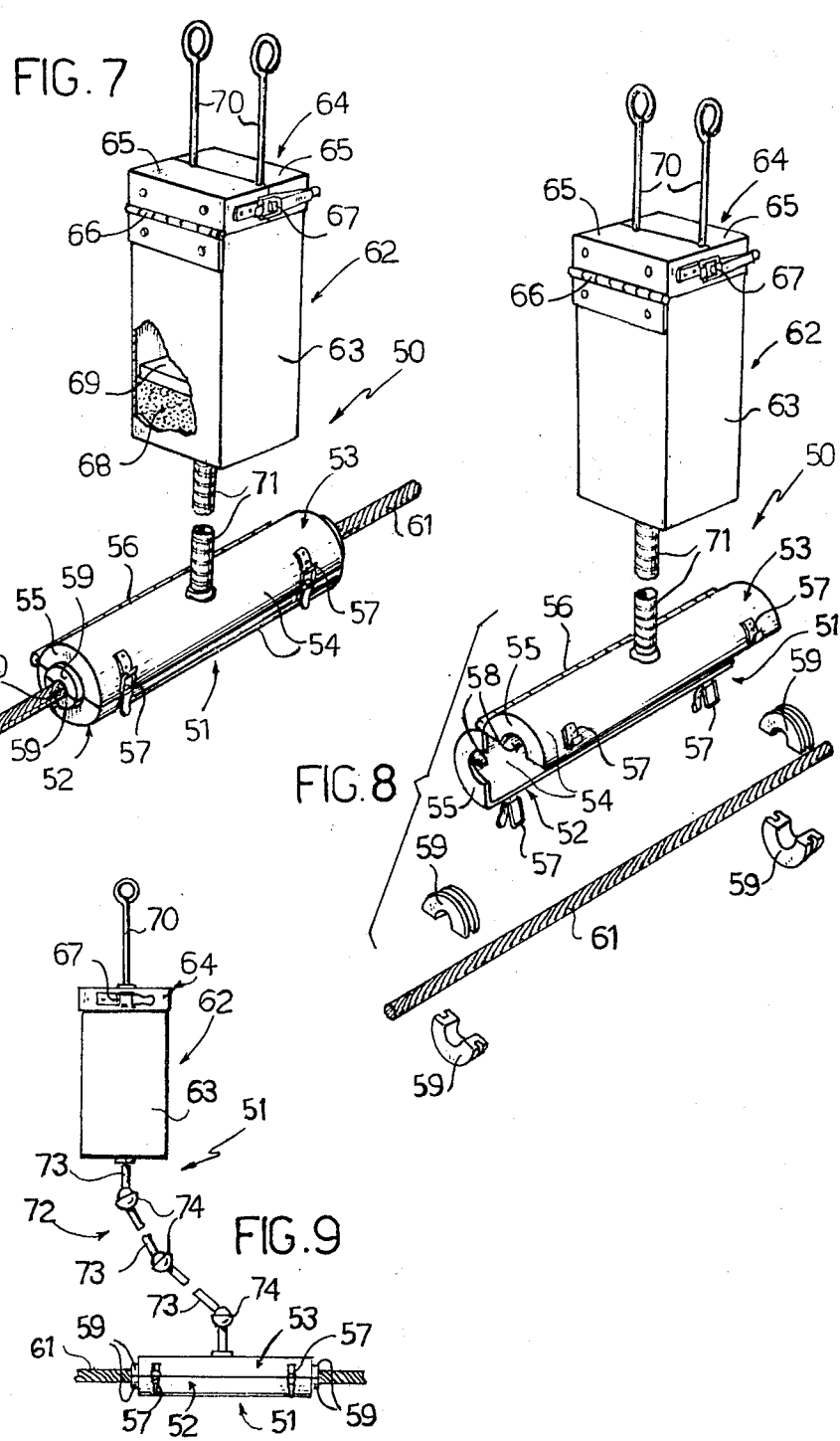

GREASING DEVICE FOR CABLES

CROSS REFERENCE TO RELATED APPLICATION

Applicant claims priority from corresponding Italian patent application Ser. No. 70303-A/73 filed Nov. 12, 1973.

BACKGROUND OF THE INVENTION

The present invention relates to a greasing device for cables.

It is known that cables, and in particular metal cables which are mounted on systems of pulleys, need to be constantly greased. Greasing is carried out to assure smoothness and uniformity to the movement of said cables, as well as to enable the elementary wires constituting the strands of said cables to slide relative to one another when the cables are under tension, and to protect said cables from the external ambient.

In particular, metal cables of cranes, cableways, winches, and lifting apparatus in general, and of fishing boats and mine sweepers are kept constantly greased.

Up to now, the above cables have been greased at time intervals by smearing a film of grease on the whole surface of the cables by means of brushes or spray guns.

The above manual operations or techniques have a number of drawbacks. Firstly, the devices or apparatus comprising said cables to be greased must be stopped, and cannot be used for the whole duration of the greasing operation. Secondly, manual smearing of grease on a cable by means of brushes or spray guns involves a considerable waste of grease and a bad distribution of the same on the surface of the cable, since formation of a uniform film of grease having a predetermined thickness on the whole surface of the cable by manual smearing said grease is practically impossible. Moreover, particularly with apparatus comprising very long cables, such a manual greasing operation is very expensive because of both the cost of labour and the long time period of forced inactivity of said apparatus. Finally, manual greasing of cables may result in a very dangerous operation when the cables of a crane or those of a cableway are to be greased.

SUMMARY OF THE INVENTION

It is an object of the present invention to provide a greasing device for automatically greasing cables, no manual work and, above all, no stoppage of the operation of the apparatus on which said cables are mounted being required for carrying out a greasing operation when using said greasing device.

The above object is attained by the greasing device subject of the present invention since it comprises at least one hollow body having walls defining an inner chamber adapted to be filled with a predetermined quantity of a lubricating material having a relatively high coefficient of viscosity, and a predetermined pressure. At least one couple of apertures is provided through said walls for a cable to be greased to extend therethrough and across said inner chamber so as to come into contact with said lubricating material inside said chamber, the size of said apertures being such that a predetermined clearance is present between the periphery of each aperture and the surface of the cable when the latter is mounted through the greasing device.

Upon movement of the cable to be greased relative to the greasing device, the lubricating material flows through at least one of said clearances, and forms a continuous tubular film or sleeve surrounding the cable.

In order to make it possible for the greasing device to be mounted on a cable without having to thread said cable through the greasing device, the hollow body preferably consists of two half shells which may be assembled in a face-to-face relationship. Said half shells are preferably connected to each other so as to be rotatable relative to each other about an axis, which may be parallel to the axes of the apertures of the cable; said apertures being defined by facing recesses formed in the facing free edges of said half shells.

BRIEF DESCRIPTION OF THE DRAWINGS

The inventione will be described, by way of example with reference to the accompanying drawings, in which:

FIG. 3 is a perspective view of the greasing device shown in FIG. 2, the device being shown in a partially open position;

FIG. 4 is a perspective exploded view of the greasing device shown in FIGS. 2 and 3;

FIG. 5 is a part sectioned perspective view of a second embodiment of the greasing device subject of the present invention;

FIG. 6 is an enlarged exploded perspective view of the greasing device shown in FIG. 5;

FIG. 7 is a perspective view of a third embodiment of the greasing device subject of the invention;

FIG. 8 is a partially exploded persepctive view of the greasing device shown in FIG. 7; and FIG. 9 is a side view of a fourth embodiment of the greasing device subject of the invention.

DETAILED DESCRIPTION OF THE INVENTION

Figures 1, 2:
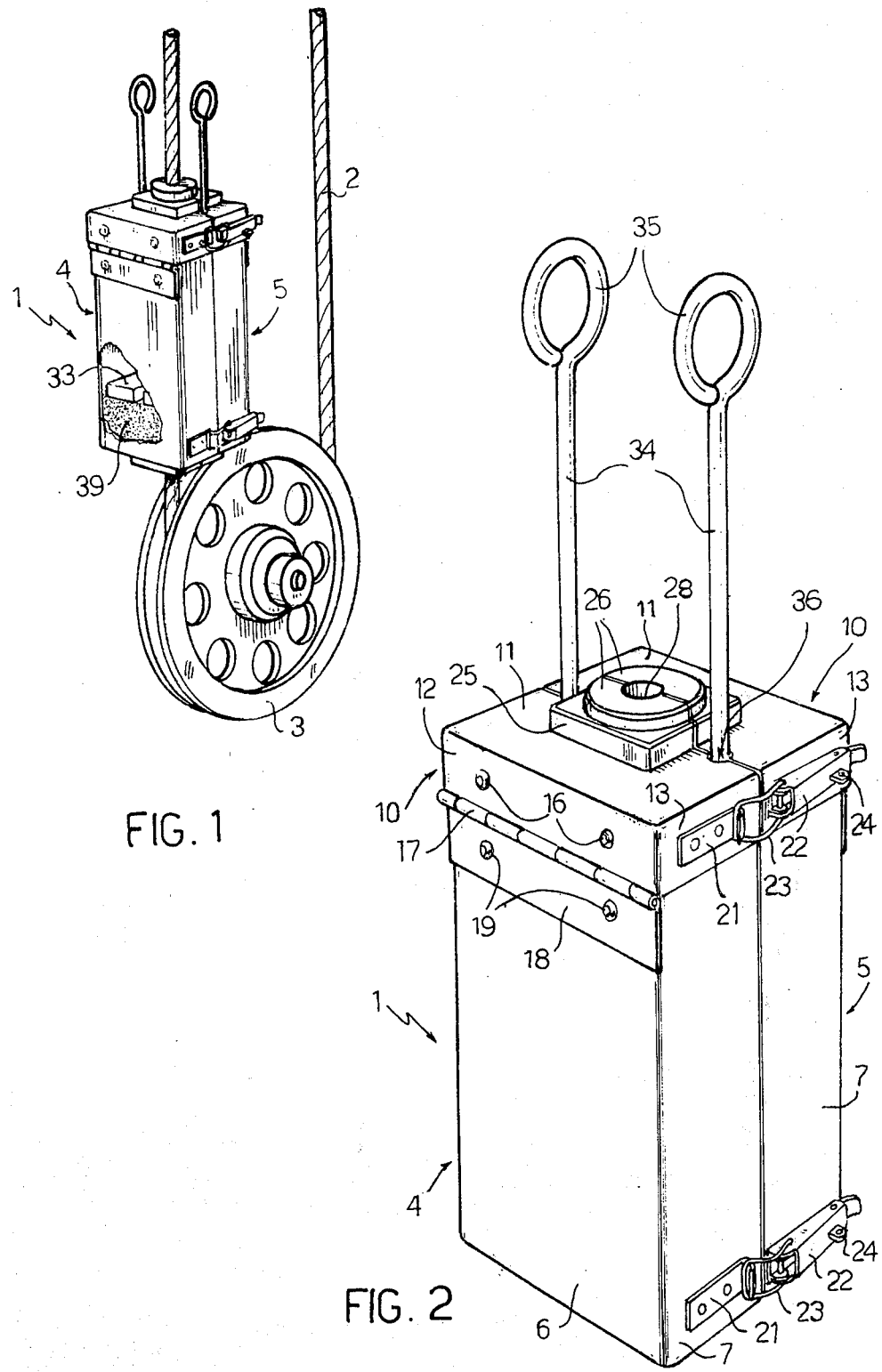
FIG. 1 is a partially sectioned perspective view of a first embodiment of the greasing device subject of the present invention, the device being shown as mounted on a vertical cable of a crane.
FIG. 2 is a perspective enlarged view of the device shown in FIG. 1.

FIGS. 1 to 4 show a greasing device 1 for greasing cables having a substantially vertical axis. In particular, greasing device 1 is shown in FIG. 1, by way of example, as mounted on a cable 2 of a crane (not shown), and supported by a pulley 3 which may be, for example, the pulley supporting a hook (not shown) for connection of a load (not shown) to be lifted to the lifting apparatus of the crane.

As shown in FIGS. 2 to 4, greasing device 1 comprises a hollow body consisting of two half shells 4 and 5 which are equal in shape and size. Each half shell 4, 5 comprises a C-shaped lateral member consisting of a lateral plate 6, two plates, indicated at 7 and 8 respectively, also rectangular and extending at right angles to plate 6 from the vertical lateral edges of the latter, a bottom plate 9, three of the four edges of which are connected to the lower edges of plates 6, 7 and 8 respectively, bottom plate 9 extending at right angles to plates 6, 7 and 8, and an upper member 10.

Upper member 10 comprises an upper plate 11, which is substantially equal in shape and size to plate 9, and three plates, indicated at 12, 13 and 14 respectively, extending from three of the four edges of plate 11 and at right angles to the same. On the inner surface of plate 12, a plate 15 is arranged which is connected to plate 12 by means of nails 16. The free edge of plate 15 is connected to a second plate 18 by means of a hinge 17 parallel with the upper edge of plate 6, plate 18 being connected to the outer surface of plate 6 by means of nails 19. By rotating upper member 10 about hinge 17, it is possible to bring the inner surface of plate 11 into contact with the upper edge of plates 6, 7 and 8, and the inner surface of plates 13, 14 and 15 into contact with the outer surface of plates 7, 8 and 6 respectively. Half shells 4 and 5 are connected to each other by means of a hinge 20 connecting the lateral free edges of the two plates 8 to each other.

For fixing half shells 4 and 5 in a contact position to form a closed envelope, greasing device 1 is provided with two fastening devices known per se. Each fastening device comprises a hook 21 connected to half shell 4, and an operating lever 22 pivottally mounted on half shell 5 in a position adjacent to hook 21. Operating lever 22 supports a loop 23 which is arranged eccentric relative to the pivot of lever 22, and has such a length as to easily engage hook 21 when operating lever 22 is rotated about its pivot toward hook 21, and to pull hook 21 toward operating lever 22 when the latter is rotated toward half shell 5 and arranged in a position in which lever 22 is parallel with its supporting plate. This plate is provided with an extension 24 which extends through an aperture provided in the operating lever 22, when the latter is rotated into contact with said plate, and allows a locking pin (not shown) to be mounted for locking operating lever 22 in the closed position.

Hooks 21 are arranged the first on plate 13 of upper member 10 of half shell 4, and the second close to the lower end of plate 7 of half shell 4 respectively. Operating levers 22 are likewise arranged the first on plate 13 of upper member 10 of half shell 5, and the second close to the lower end of plate 7 of half shell 5 respectively.

The fourth edge of each plate 11 is a free edge and is centrally provided with a semicircular recess surrounded by a semiannular reinforcing element 25. When half shells 4 and 5 are closed in the aforementioned contact position, and upper members 10 are in their closed position, said free edges of plates 11 are in contact with each other. In this position, reinforcing elements 25 and their respective recesses define a circular aperture or hole extending through the upper wall of greasing device 1. Said hole accommodates a cylindrical bush consisting of two half bushes 26 each of which is separately mounted on the respective plate 11 prior to closing greasing device 1. Each half bush 26 is provided, on its outer surface, with a peripheral groove 27 which is adapted to accommodate the respective reinforcing element 25 and the thickness of the respective plate 11. When half shells 4 and 5 are in said contact position, half bushes 26 define a cylindrical hole 28 having a predetermined diameter and communicating with the inside of greasing device 1. A second hole 29, which is co-axial with, and equal in diameter to, hole 28, is defined through the bottom of greasing device 1 by two half bushes 30. Half bushes 30 are each provided with a peripheral groove 31 and are mounted in respective recesses which are provided centrally on the fourth edge of each plate 9, each said recess being surrounded by a semiannular reinforcing element 32.

A plate 33, parallel with plates 9, is mounted within an inner chamber defined by half shells 4 and 5 when arranged in said contact position, plate 33 forming a piston adapted for vertical movement along said chamber and in contact with the lateral tubular surface thereof. Two rods 34 extend upwards from the upper surface of plate 33, each rod 34 extending at right angles to said upper surface, and being bent at its upper end so as to form a loop 35. Each rod 34 is longer than the hollow body formed by half shells 4 and 5, and extends outside said hollow body through a respective hole 36 (only one of which is shown in FIG. 2) formed by two semicircular recesses provided in the facing edges of plates 11 of upper members 10. Holes 36 are arranged at equal distance from, and on opposite sides of, hole 28. Plate 33 is provided with a central through hole 37 substantially equal in diameter to holes 28 and 29 and aligned therewith, and a recess 38 extending from the periphery of hole 37 to the periphery of plate 33.

Greasing device 1 is mounted on cable 2 as follows:

The fastening devices for connection of upper members 10 to each other are opened, and upper members 10 are rotated outwards about the respective hinges 17 so as to open, at its upper end, the hollow body formed by half shells 4 and 5. Plate 33 is then extracted from said hollow body through said open end of the latter, the fastening devices mounted on plates 7 are opened, and half shells 4 and 5 are rotated relative to each other, away from said contact position, about hinge 20. Two pairs of half bushes 26 and 30 are then mounted on upper member 10 and plates 9 respectively, said pairs of half bushes defining holes 28 and 29 respectively, each having a diameter slightly larger than that of cable 2 to be greased. Greasing device 1 is then arranged on cable 2, and half shells 4 and 5 are closed on the latter so that cable 2 extends through hole 29. The fastening devices mounted on plates 7 are then closed, and a predetermined quantity of grease, indicated at 39 in FIG. 1, is poured through the open upper end of greasing device 1. Plate 33 is then mounted on cable 2 by laterally inserting the latter into central hole 37 via recess 38; plate 33 is then inserted into greasing device 1 via its open upper end and brought to rest on the free surface of grease 39. Upper members 10 are then rotated toward each other into their closed position, so that half bushes 26 embrace cable 2. The fastening devices for connection of upper members 10 to each other are then closed, and greasing device 1 is ready for operation.

In use, the length to be greased of cable 2 is made to reciprocate through greasing device 1, which is preferably kept in a fixed position. The aforementioned to and fro movement of cable 2 through greasing device 1 may be carried out during normal operation of the device or apparatus on which cable 2 is mounted.

During said to and fro movements, cable 2 moves through grease 39 and holes 28 and 29. When cable 2 enters greasing device 1 through hole 28 and comes out through hole 29 after passing through grease 39, cable 2 first deposits a small quantity of grease on the outer end of hole 28, and then entrains part of grease 39, said part of grease 39 being formed into a tubular film having a substantially constant thickness, and extending over the whole surface of cable 2, by passage of cable 2 through hole 29, the thickness of said film being equal to that of the annular space or clearance present between cable 2 and the surface of hole 29. The pressure applied by gravity to grease 39 by plate 33 assures the continuity of said grease film as long as some grease is present inside greasing device 1. When, during a to and fro movement, cable 2 enters greasing device 1 via hole 29, it deposits a small quantity of its grease on the outer end of hole 29. Cable 2 then passes through grease 39, a certain amount of which sticks to the outer surface of cable 2. Said grease entrained by cable 2 is smeared on the latter, so as to form a tubular film having a substantially uniform thickness, when cable 2 passes through hole 28, on the inner end of which part of the entrained grease is deposited.

The formation of a small grease deposit on the outer end of hole 28 (29), when cable 2 enters greasing device 1 through hole 28 (29), is due to the fact that the uniform grease film covering cable 2 is deformed by the latter coming into contact with operating and/or guiding elements, such as pulleys.

Since grease 39 is taken from, and then brought back to, greasing device 1 during the to and fro movements of cable 2, the consumption of grease is very small, and greasing device 1 may operate effectively for a relatively long time during which it assures a perfect greasing of the cable. The level at which the free surface of grease 39 is arranged inside greasing device 1 is constantly indicated by the length of the portion of rods 34 which extends outside greasing device 1, so that operation of greasing device 1 after complete exhaustion of grease 39 may be easily avoided. The grease film deposited on cable 2 by means of greasing device 1 has always a substantially uniform and constant thickness, since the grease flows under pressure through the annular space present between cable 2 and the surface of holes 28 and 29, said pressure assuring that cable 2 is co-axial with holes 28 and 29 as it will be explained later. The flow under pressure of the grease through hole 29 is assured on the one hand by plate 33 when cable 2 comes out of greasing device 1 via hole 29, and on the other hand by a slight vacuum present inside grease 39 when cable 2 enters greasing device 1 via hole 29, said vacuum causing some of the grease forming the aforementioned small deposit at the outer end of hole 29 to be constantly sucked into greasing device 1. The flow under pressure of the grease through hole 28 is assured by the fact that cable 2, coming out of (entering) greasing device 1 via hole 28, deposits at the inner (outer) end of the latter the aforementioned small amount of grease which, as it is deposited, is moved toward the outside (inside) of greasing device 1 by the sucking action caused by the movement of the cable. The grease under pressure flowing through the annular space present between cable 2 and the surface of holes 28 and 29 forms two radial bearings between greasing device 1 and cable 2, which bearings react elastically to any action tending to eliminate the alignment existing between cable 2 and holes 28 and 29.

It is to be pointed out that, during a greasing operation, greasing device 1 operates also as a control device for the state of cable 2, since breakage of even a single strand or elementary wire of cable 2 makes it very difficult for cable 2 to enter greasing device 1, so that the latter signals with jerks and jolts the damaged state of cable 2.

FIG. 1 shows a particular arrangement of greasing device 1 on a cable of a crane. As shown in FIG. 1, greasing device 1 rests, with one of its lower corners, on the periphery of pulley 3, which supports the hook for connection of a load to the crane. In this way, not only any means for connecting greasing device 1 to any fixed support is avoided, but also the operation of greasing device 1 is improved by the contact of the latter with pulley 3. The friction between pulley 3 and greasing device 1 tends in fact to cause the latter to oscillate about the aforementioned lower corner, said oscillation being prevented by the elastic reaction of the radial bearings made of grease and present inside holes 28 and 29. The above results in a slight vibration having both vertical and horizontal components, said vibration promoting the movement of grease 39 toward hole 29.

Obviously, greasing device 1 may be provided with several couples of holes 28 and 29 so as to be adapted for simultaneous use with several parallel cables.

FIGS. 5 and 6 show a greasing device 40 which is mounted on a substantially horizontal cable 41. Cable 41 may be, for example, a cable towed by a mine sweeper or a fishing boat.

Greasing device 40 is similar to greasing device 1, and the corresponding parts of the two greasing devices will be marked with the same reference numbers.

As greasing device 1, greasing device 40 comprises two half shells 4 and 5 substantially similar in shape to those of greasing device 1, and each consisting of a lateral member comprising three rectangular plates 6, 7 and 8, a lower plate 9, and an upper member 10 comprising an upper plate 11, and three lateral plates 12, 13 and 14. Each upper member 10 is hinged to plate 6 of the respective half shell 4 or 5 by means of a hinge 17, and is fastened to the upper member 10 by means of two releasable fastening devices each comprising a hook 21, an operating lever 22, and a loop 23 releasably engaging hook 21.

Different from greasing device 1, half shells 4 and 5 of greasing device 40 are connected to each other by means of a hinge 44 extending along the facing edges of plates 9. A further difference between greasing devices 1 and 40 consists in that, in greasing device 40, half bushes 26 and 30 are mounted in respective semicircular recesses provided close to plate 9 on the facing edges of plates 8 and 7 respectively, said half bushes defining two co-axial holes 28 and 29 which extend at right angles to the longitudinal axis of plate 6. Half shells 4 and 5 of greasing device 40 are fastened to each other by two releasable fastening devices mounted on plates 7 and 8. Said fastening devices are similar to those mounted on upper members 10 and are marked with the same reference numbers.

A plate 42 is mounted as a piston inside an inner chamber defined by half shells 4 and 5. Plate 42 is provided with two rods 34 each forming a loop 35 at its upper end.

Handles or brackets 43 are connected to the outer surface of plates 6 to allow greasing device 40 to be lifted and to be secured in a fixed vertical position after having been mounted on cable 41.

The mounting and operation of greasing device 40 are substantially similar to those already described in connection with greasing device 1, the only substantial difference being that, in greasing device 1, the grease inside the device may be consumed completely, whereas in greasing device 40, some grease has to be added any time plate 42 comes to rest on cable 41.

Obviously, greasing device 40 may be provided with several couples of holes 28 and 29 so as to be adapted for simultaneous use with several horizontal cables extending parallel with one another on a substantially vertical plane.

As mentioned above, the grease arranged inside greasing device 40 below cable 41 cannot be used during a greasing operation. In order to reduce this amount of unusable grease, a variant (not shown) of greasing device 40 may be provided in which each plate 9 comprises a flat portion and a substantially semicylindrical portion extending downwards from said flat portion. Said semicylindrical portions of plates 9 are connected to each other at their free end by hinge 44, and define the lateral walls of a substantially cylindrical chamber communicating, via a lateral passage, with the chamber in which plate 42 is slidably mounted. Plates 7 and 8 are provided with lower extensions which extend downwards to form the end walls of said substantially cylindrical chamber, and are provided with recesses in which half bushes 26 and 30 are mounted. In this way, the amount of unusable grease is reduced to that occupying said substantially cylindrical chamber.

FIGS. 7 and 8 show a greasing device 50 comprising a tubular body 51 consisting of two half shells 52 and 53 each comprising a lateral semicylindrical wall 54 and two semicircular end walls 55. Half shells 52 and 53 are connected to each other by a hinge 56 extending along one pair of facing free edges of lateral walls 54, tubular body 51 being provided with two releasable fastening devices 57, similar to the fastening devices of greasing devices 1 and 40, adapted to keep half shells 52 and 53 in a contact position shown in FIG. 7. Each end wall 55 has a straight free edge provided with a central semicircular recess 58 (FIG. 8). When half shells 52 and 53 are arranged in the contact position as shown in FIG. 7, the two recesses 58 formed on each pair of corresponding end walls 55 define a circular hole which accommodates a couple of half bushes 59 similar to half bushes 26 and 30 of greasing devices 1 and 40, and defining a cylindrical hole 60 (FIG. 7) for a cable 61 to extend therethrough with a predetermined side clearance.

Greasing device 50 further comprises a tank 62 comprising a cup-shaped body 63 which is closed at its upper end by a cover 64 formed by two halves 65. Each half cover 65 is hinged to body 63 by means of respective hinge 66 so as to be rotatable about an axis away from the closed position shown in FIG. 7 to open the upper end of tank 62. Half covers 65 are releasably kept in said closed position by means of two releasable fastening devices 67 (only one of which is shown) similar to fastening devices 57. As shown in FIG. 7, a predetermined quantity of grease, indicated at 68, is arranged inside the tank 62, and is compressed toward the bottom of the latter by a compression plate 69 slidably mounted inside body 63, and provided with rods 70. Rods 70 extend upwards from plate 69 and through cover 64. Tank 62 is connected to tubular body 51 by a flexible duct 71, one end of which extends through the bottom of tank 62, and the other end of which extends through one of lateral walls 54.

FIG. 9 shows the same greasing device 50 described above, in which flexible duct 71 of FIGS. 7 and 8 has been eliminated and replaced by an articulated duct 72, the latter comprising a plurality of duct segments 73 connected in series by spherical joints 74.

In use, grease 68 present within tank 62 is compressed into tubular body 51 via duct 71 and 72 so as to grease cable 61 which extends through tubular body 51 via holes 60.

Tank 62 is generally supported in a fixed position and, owing to the presence of duct 71 or 72, is not affected by any angular oscillation of cable 61. In order to avoid any traction stress on duct 71 or 72, the length of said duct is preferably chosen so that said duct is bent in any working condition.

Obviously, body 51 may have an elongated shape different from the cylindrical shape shown in FIGS. 7 to 9, and more than one hole may be present through its end walls so as to be adapted for simultaneous use with a plurality of parallel cables. Moreover, more then one body 51 may be connected to tank 62 by means of a respective duct 71 or 72.

According to a variant (not shown) of the greasing devices described above, the rods of the compression plate are connected to the compression plate in a releasable way so as to allow one or more plates or weights to be arranged on said compression plate for adjusting the pressure applied to the grease.

In the shown greasing devices, the holes for passage of the cable or cables to be greased are each defined by one pair of half bushes. By providing each greasing device with a series of pairs of half bushes having different internal diameters, it is possible to adjust said greasing device to a number of cables having different diameters. On the contrary, according to another variant (not shown) of the greasing devices described above, the aforementioned half bushes are eliminated and the inlet and outlet holes for the or each cable are provided directly through the walls of the chamber across which said cable extends, this variant being thus adapted for use with a single type of cable having a predetermined diameter.

According to a variant (not shown) of the greasing devices shown in FIGS. 5 to 9, the compression plate is repalced by an elastic chamber connected to a source of compressed fluid via means known per se for controlling the pressure of said fluid inside said elastic chamber, the latter being arranged so as to be adapted to apply a predetermined adjustable pressure to the grease.

The variants described above are given as exaples of the innumerable modifications which may be made to the shown greasing devices without departing from the scope of the invention as defined in the attached claims.

What I claim is:

1. Apparatus for providing a moving cable with a continuous tubular coating layer of grease of a substantially uniform predetermined thickness, said apparatus comprising:

wall means having walls for defining a grease chamber;

first aperture-defining means defining an aperture at one side of the chamber through which a cable enters the chamber, said first aperture-defining means bounding an annular clearance of predetermined size about the periphery of a cable;

second aperture-defining means defining an aperture at an opposite side of the chamber which is substantially aligned with the aperture at said one side of the chamber and through which a cable leaves the chamber, said second aperture-defining means bounding an annular clearance of predetermined size about the periphery of a cable; and pressure means comprising a traveling member that presses through a distance continuously grease on in the chamber to force grease against a cable and also to press grease towards the annular clearance bounded by said first aperturedefining means during the passage of a cable through said apertures.

2. Apparatus as claimed in claim 1, wherein the size of at least one of said annular clearances is adjustable.

3. Apparatus as claimed in claim 2, wherein the first and second aperture-defining means comprise first and second bush members respectively and the apparatus further comprises at least one additional bush member which is interchangeable with one of said first and second bush members and which is sized to cooperate with a cable to define therewith an annular clearance of different size from the annular clearance defined by a cable of the same size and said one of said first and second bush members.

4. Apparatus as claimed in claim 1, wherein the magnitude of the pressure applied by the pressure means is adjustable.

5. Apparatus as claimed in claim 1, wherein the pressure means comprise a member which applies pressure to the grease by virtue of the effect of gravity on the mass of the member.

6. Apparatus as claimed in claim 5, wherein the member constituting said pressure means is accommodated within the grease chamber and is formed with an aperture through which a cable extends.

7. Apparatus for providing a moving cable with a continuous coating layer of grease of a substantially uniform predetermined thickness, said apparatus comprising:
wall means defining a grease chamber, said wall means including at least first and second wall portions which are opposite one another and which are formed with respective apertures; a first bush member which is releasably mounted in the aperture formed in said first wall portion and through which a cable enters the chamber, the first bush member bounding an annular clearance of predetermined size about the periphery of a cable;
a second bush member which is releasably mounted, substantially in alignment across the chamber with said first bush member, in the aperture formed in said second wall portion and through which a cable leaves the chamber, said second bush member bounding an annular clearance of predetermined size about the periphery of a cable; and
pressure means comprising a traveling member that presses through a distance for continuously pressing grease in the chamber towards the annular clearance bounded by said first bush member during the passage of a cable through said bush members.

8. Apparatus as claimed in claim 7, wherein the size of at least one of said annular clearances is adjustable.

9. Apparatus as claimed in claim 8, comprising at least one additional bush member which is interchangeable with one of said first and second bush members and which is sized to cooperate with a cable to define therewith an annular clearance of different size from the annular clearance defined by a cable of the same size and said one of said first and second bush members.

10. Apparatus as claimed in claim 7, wherein the magnitude of the pressure applied by the pressure means is adjustable.

11. Apparatus as claimed in claim 7, wherein the pressure means comprise a member which applies pressure to the grease by virtue of the effect of gravity on the mass of the member.

12. Apparatus as claimed in claim 11, wherein the member constituting said pressure means is accommodated within the grease chamber and is formed with an aperture through which a cable extends.

13. Apparatus for providing a moving cable with a continuous tubular coating layer of grease of a substantially uniform predetermined thickness, said apparatus comprising:
first and second substantially cup-shaped members arranged with their rims in contact with each other so as to define a grease chamber, each cup-shaped member being formed at its rim with two recesses which register with respective recesses formed at the rim of the other cup-shaped member to form two apertures at opposite respective sides of the grease chamber;
clamp means releasably clamping the first and second cupshaped members together;
a first bush member which is releasably clamped between said cup-shaped members in one of said apertures and through which the cable enters the grease chamber, said first bush member bounding an annular clearance of predetermined size about the periphery of a cable;
a second bush member which is releasbly clamped between said cup-shaped members in the other of said apertures, substantially in alignment across the grease chamber from the first bush member, and through which the cable leaves the grease chamber, said second bush member bounding an annular clearance of predetermined size about the periphery of the cable; and pressure means comprising a traveling member that applies pressure through a distance for continuously pressing grease in the chamber towards the first bush member during the passage of a cable through said bush members.

14. Apparatus as claimed in claim 13, wherein each bush is formed with a peripheral groove engaged by portions of the cup-shaped members bounding said recessess.

15. Apparatus as claimed in claim 14, wherein each of said bush members comprises two half bushes which are clamped together by virtue of the cup-shaped members' being clamped together.

16. Apparatus as claimed in claim 13, wherein the size of at least one of said annular clearances is adjustable.

17. Apparatus as claimed in claim 16, comprising at least one additional bush member which is interchangeable with one of said first and second bush members and which is sized to cooperate with a cable to define therewith an annular clearance of different size from the annular clearance defined by a cable of the same size and said one of said first and second bush members.

18. Apparatus as claimed in claim 13, wherein the magnitude of the pressure applied by the pressure means is adjustable.

19. Apparatus as claimed in claim 13, wherein the pressure means comprise a member which applies pressure to the grease by virtue of the effect of gravity on the mass of the member.

20. Apparatus as claimed in claim 19, wherein the member constituting said pressure means is accommodated within the grease chamber and is formed with an aperture through which a cable extends.

* * * * *